Dec. 23, 1969     G. G. SEE     3,485,023

CABBAGE HARVESTER

Filed Feb. 6, 1967     2 Sheets-Sheet 1

INVENTOR.
GARY G. SEE
BY Ray S Pyle
ATTORNEY

United States Patent Office 3,485,023
Patented Dec. 23, 1969

3,485,023
CABBAGE HARVESTER
Gary G. See, 19201 Euclid Ave., Apt. 646,
Euclid, Ohio 44117
Filed Feb. 6, 1967, Ser. No. 614,329
Int. Cl. A01d 45/26
U.S. Cl. 56—327                     4 Claims

ABSTRACT OF THE DISCLOSURE

A vegetable leaf stripping gate which will yield to a solid cabbage head but will strip down the loose external leaves. The gate is closed by uniform flaps in one embodiment for small light-leaf plants. Another embodiment provides for a tapered, adjustable overlay to produce a uniform resilient action as the headed plant emerges through the slot of the gate. Another embodiment is shown wherein the resilient material backed by the tapered overlay is in the form of individual fingers to produce a maximum head conformity. The stiff overlay material and the resilient flap material cooperate to produce a uniform head stripping action. Coupled with the gate is a cutting instrument in the form of a slotted blade cutting by virtue of a slot having a sharpened apex. The gate is forced over the headed vegetable and the blade then moved in to sever the stem. The device is singular, but a twin pair is illustrated, however, without auxiliary support, transport, and power devices necessary to implement the harvester in commercial practice.

SUMMARY OF THE INVENTION

Discovery that a cabbage can be stripped of its excess leaves by a yieldable gate structure, and severed by moving a knife edge to the stem while holding head separated from leaves. A resiliently apertured orifice permits a headed vegetable to force its way through, but loose external leaves are unable to force aside the aperture devices and are, therefore, stripped back from the head. A cutting device is then caused to sever the stem for removal of the head free of its external leaves.

DESCRIPTION OF THE PREFERRED DRAWINGS

The two harvesting devices are illustrated separate from any carriage structure or auxiliary equipment. Such structure will be constructed according to the size of the farming area, using human or mechanical means for collateral operations as desired.

The primary function of the device is to separate head from leaves. This function is produced by a gate 10, closed by two flexible closure flaps 12 and 14. The flaps are held by a superstructure frame 16. Clamp rails 18 serve as removable clamp devices, holding one edge only of each flap, with the flaps extending toward one another.

The function of gate 10, whether it be a two-flap, four-flap, multiple resilient fingers, or otherwise, is to provide a clinging wiping aperture action. The gate is brought down over the head to be harvested. A loose leafy plant would be flattened, but a solid headed plant such as a cabbage will withstand a properly selected structure, causing the gate aperture to open over the head in a tightly clinging action. The loose outer leaves, however, do not have the necessary strength to withstand the gate, and are turned back.

Figure 1:
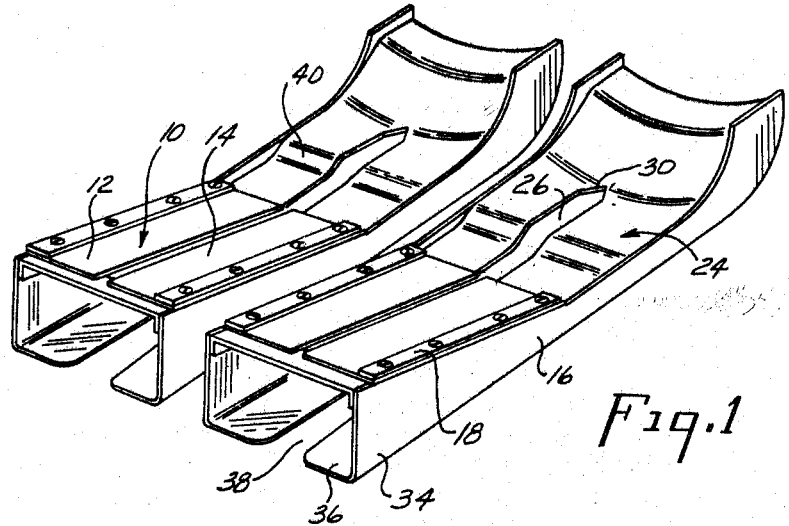
FIGURE 1 is a perspective view of two identical harvesting devices in side-by-side relationship to suggest gang operation by a carriage device.

The gate 10 illustrated in FIGURE 1 defines a fixed opening or aperture when the flaps 12, 14 are fully open. The opening defined by the open flaps is for small table-grade heads. Larger size heads will dictate a wider slot between the flaps, whereas a farmer harvesting various sizes may desire an adjustable holder to permit the flap spread to be adjustable.

A headed vegetable will emerge through the gate with most of the external loose leaves stripped down. It is thereafter necessary only to sever the stem just under the head to harvest a clean product ready for market.

In the device as illustrated in FIGURE 1, which is intended for mechanized field operation carried by a power device, the severing is done by a bifurcated blade 24. Blade 24 is connected tandem-fashion to the gate for sequential operation. A slot 26 begins on one perimeter of blade 24 adjacent the gate, and extends along a path aligned with the center of the gate aperture to a sharpened stem severing formation 30 within the body of the blade.

Figure 2:
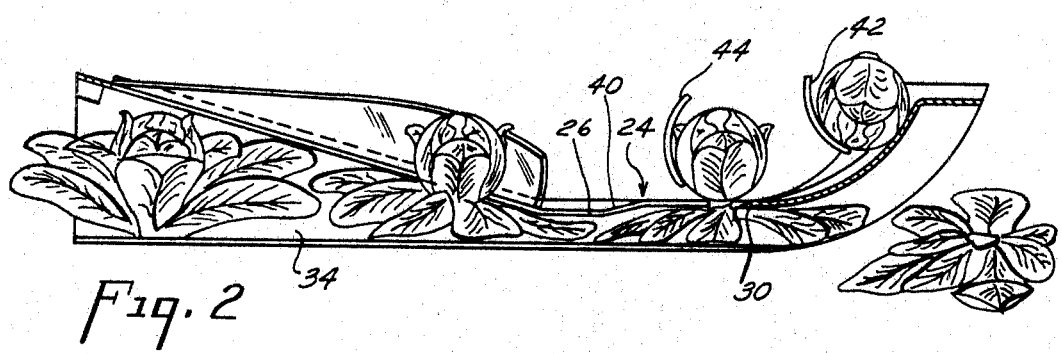
FIGURE 2 is a longitudinal section through one of the devices in operation to harvest cabbage.

FIGURE 2 reveals the action of this combination. There are three plants and one stump in the illustration. One severed head is cut free of the stump and is being swept to a collecting station. The gate 10 is tilted forwardly and upwardly with respect to a horizontal movement and, therefore, has a downwardly stripping action with respect to a growing cabbage as it advances upon a head. The action is substantially equal to a fully vertical approach.

The second cabbage in the row is in the stage of forcing the flaps open, and will be fully through the gate, with the stripped head projecting above the flaps, by the time the blade 24 reaches the plant.

Further advance causes the stem of the plant and slot 26 to register, with the leaves under the blade and the head on top. The roots are firm in the soil. Hence, upon advance of the severing formation 24 toward the stem, the head will be cut away from the leaves, which remain clinging to the rooted stem portion. Any leaf not trapped under the blade will be attached so close to the severed stem that it will break away in subsequent handling preparatory for market.

To make the construction more practical, a frame 34 provides a means for holding the gate and blade spaced from the earth surface and holds them in operative relationship. The frame also provides a base to which external operating structure may be attached. Support wheels and a power tractor cause the frame 34 to act as a means for first forcing the gate over a vegetable head until the head emerges through the gate with the leaves stripped back, and thereafter direct the blade 24 to register slot 26 with the stem of the vegetable and to move the blade in a stem severing action.

The frame has a bottom wall 36 split longitudinally by registration slot 38. It may be said that the bottom wall is composed of two opposed walls spaced by a gap or slot. It is slot 38 that provides registration of the harvesting device and the cabbage stem. The slot between flaps 12 and 14 is thus centered over the head for good leaf stripping action.

The blade is humped in the slot area by area hump 40. The hump has the effect of pulling up on the bottom of the head for close severing of the stem. The entrance end of the slot is low to catch the lowest plant, and the hump 40 assures close reference to the head on a tall stem plant. The short stem plants are pulled slightly from the earth, but not uprooted. All heads are then referenced from a close cutting position.

Curved blades 42 and 44 represent operating scoops in a chain device acting to scoop severed heads from the blade area. The rear portion of the blade is upwardly curved to provide elevation to place the severed heads onto a conveyor system. The rolling action has been found useful in loosening leaves which may be oriented and situated such that they successfully evade the stripping action and go above the blade. Such leaves will have a weak attachment and will tend to break away easily.

Figure 3:
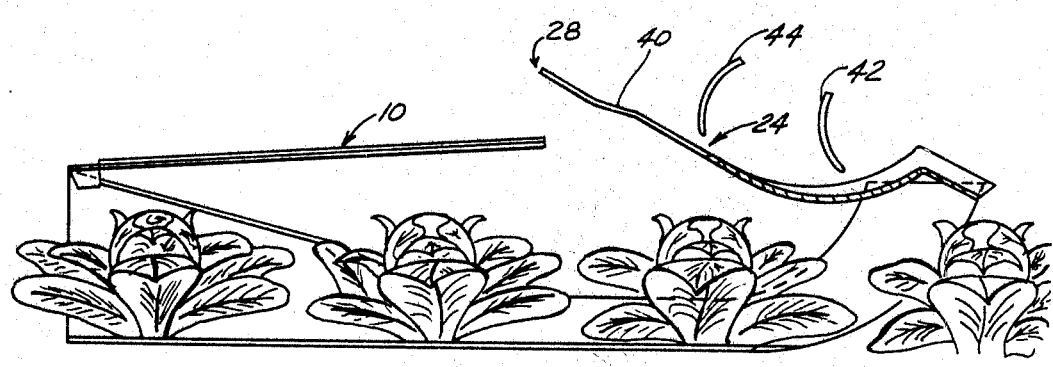
FIGURE 3 illustrates one manner of by-passing a portion of a row during harvesting operations.

Further refinements are illustrated in FIGURE 3 in that the gate and blade are illustrated as being pivotable to an inactive position to avoid harvesting selected portions of a row. Hydraulic or mechanical devices carried by a power unit may be employed to pivot the gate and blade as illustrated in FIGURE 3. The plants pass through the slot 38 without cutting. In the alternative, the entire structure may be elevated, as when transported outside the harvest area.

Figure 4:
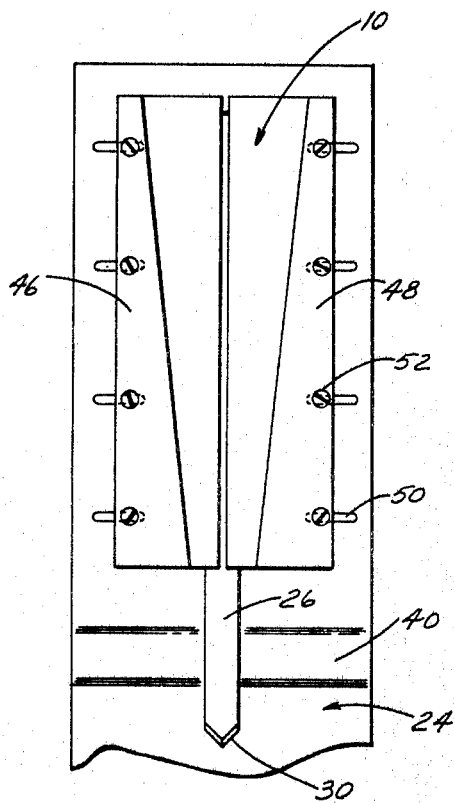
FIGURE 4 is a top plan view of the gate portion of an adjustable tapered aperture.
Figure 5:
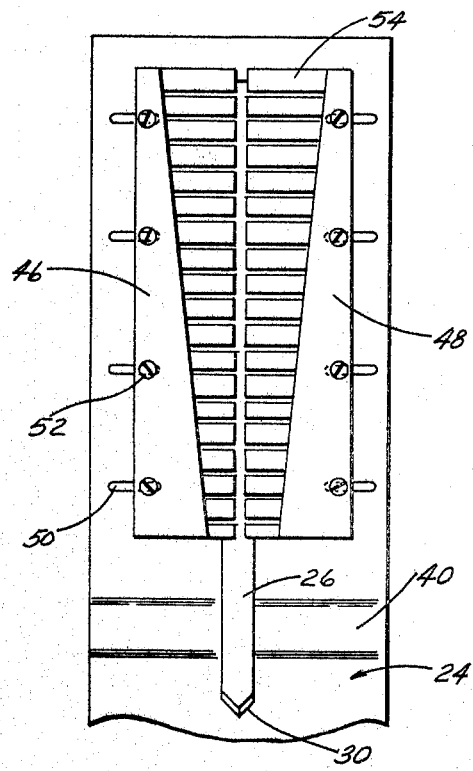
FIGURE 5 is a top plan view of the gate portion with the aperture tapered and adjustable, as well as having a plurality of separate leaf stripping fingers.

Having illustrated the fundamental device, attention is now directed to refined gate structures of FIGURES 4 and 5.

In FIGURE 4, the gate 10 is closed by the two flaps 12 and 14, but overlaid by two laterally adjustable tapered clamp rails 46 and 48. Lateral adjustment is accomplished by a plurality of slots 50 through which headed bolts 52 extend to retainer nuts under the top plate.

By this tapered structure, both the flaps and the clamp rails are adjustable to optimum conditions according to head size to be harvested. As the gate is advanced with respect to a cabbage plant, the head enters through the large forward area. As the relative motion continues, the effect is that of the head emerging through the gate and from the forward portion thereof, toward the rear. The stripping action is maintained as the largest area of a cabbage passes the plane of the gate, by reason of the tapered clamp rails. These rails approximate a constant resilient finger action by converging in that area where the flaps begin to encounter the underside of the head. The smaller slot closes in around the stem area to assure full stripping of all extraneous leaves.

FIGURE 5 illustrates a further refinement, in that individual fingers 54 each act to strip down the loose leaves. Thus, a far wider head size variety will be stripped efficiently.

What is claimed is:

1. A harvesting device for field growing vegetables having a head structure on a stem surrounded by undesired loose leaves, such as cabbage, said device comprising:
    a frame defining an opening adapted to permit passage of a headed vegetable therethrough;
    leaf stripping means yieldable closing said opening such that as the frame is moved over the vegetable a headed vegetable will thrust through said opening by forcing the leaf stripping means to yield, and at the same time the stripping means turns back loose exterior leaves; and
    means carried by said frame and movable to the position of the stem after said head has penetrated the stripping means for severing the vegetable stem as the head and leaves are divided on opposite sides of the leaf stripping means.

2. A harvesting device as defined in claim 1 further characterized in that:
    said frame has a forward portion closed by said leaf stripping means and a rearward portion formed into a shear, such that movement of the frame to strip the leaves followed by a forward movement of the frame with respect to the vegetable will sever the headed portion and capture the head but allow the stem and loose leaves to stand.

3. A harvesting device as defined in claim 1 further characterized in that:
    said leaf stripping means being a plurality of resilient flaps.

4. A harvesting device adapted to be supported by a power vehicle or a manual handle for movement over a field comprising:
    an elongated frame structure substantially C-shaped in cross section and defining a vegetable head and stem receiving area, an enlarged opening at the top of said frame structure adapted to permit the passage therethrough of a vegetable head, flap or gate means on said frame substantially closing said opening, said gate permitting the passage therethrough of a vegetable head but in the process of such passage, contacting the head and bending downwardly loose leaves, said frame further including a narrow elongated slot centrally aligned relative to said enlarged opening and adapted to receive the stem of the headed vegetable plant, that portion of the frame which defines the rear end of said slot being sharpened to constitute a bifurcated blade for cutting said stem between such loose leaves and the vegetable head.

References Cited

UNITED STATES PATENTS 1,730,759  10/1929  Crane _____ 56—327
2,707,860  5/1955  Schmidt _____ 56—327

RUSSELL R. KINSEY, Primary Examiner